(12) United States Patent
Guigand

(10) Patent No.: US 12,708,075 B2
(45) Date of Patent: Aug. 18, 2026

(54) BIODEGRADABLE TREE PLANTING APPARATUS

(71) Applicant: Cedric Marcel Joseph Guigand, Miami, FL (US)

(72) Inventor: Cedric Marcel Joseph Guigand, Miami, FL (US)

( * ) Notice: Subject to any disclaimer, the term of this patent is extended or adjusted under 35 U.S.C. 154(b) by 0 days.

(21) Appl. No.: 19/077,914

(22) Filed: Mar. 12, 2025

(65) Prior Publication Data

US 2025/0287883 A1 Sep. 18, 2025

Related U.S. Application Data

(60) Provisional application No. 63/564,662, filed on Mar. 13, 2024.

(51) Int. Cl.
*A01G 9/02* (2018.01)
*A01G 23/04* (2006.01)

(52) U.S. Cl.
CPC ........... *A01G 9/0302* (2025.01); *A01G 23/04* (2013.01)

(58) Field of Classification Search
CPC .. A01G 9/0302; A01G 9/0293; A01G 9/0291; A47G 7/06; A47G 2007/066
See application file for complete search history.

(56) References Cited

U.S. PATENT DOCUMENTS 436,183 A * 9/1890 Moore et al. .......... A01G 13/26 119/500
473,836 A * 4/1892 Goodacre ............ A01G 9/0295 47/73
610,156 A * 8/1898 Mechwart et al. .. A01G 9/0295 47/73
726,766 A * 4/1903 Schaefer .............. A01G 9/0295 47/73
2,594,307 A * 4/1952 Valenzuela ............ A01G 9/029 47/73
4,216,622 A * 8/1980 Hollenbach .............. A01G 2/20 47/73

(Continued)

FOREIGN PATENT DOCUMENTS

CN 106489599 A * 3/2017 ........... A01G 9/0291
CN 110731664 A * 1/2020 ............... A47G 7/07

(Continued)

*Primary Examiner* — Monica L Perry
(74) *Attorney, Agent, or Firm* — Dunlap Bennett & Ludwig PLLC

(57) ABSTRACT

A biodegradable tree planting apparatus designed for mangrove restoration is disclosed. The apparatus addresses the technical problem of environmental degradation caused by non-biodegradable materials in traditional reforestation methods. The apparatus comprises a first partial shell and a second partial shell, each with a half-spherical lower portion and a half-frustoconical upper portion, forming a complete shell for holding a plant. The shells are made from biodegradable materials such as biodegradable plastic or paper pulp, promoting ecological balance. The apparatus features holes for water drainage and gas exchange, and attachment tabs securing the partial shells together. This apparatus provides a sustainable solution for supporting young mangrove plants, enhancing their growth and establishment in challenging conditions, and is suitable for large-scale restoration projects.

5 Claims, 3 Drawing Sheets

(56) References Cited

U.S. PATENT DOCUMENTS

| | | | | | |
|---|---|---|---|---|---|
| 4,248,014 | A | | 2/1981 | Williames | |
| 4,813,178 | A | | 3/1989 | Ferrand | |
| 5,359,809 | A | * | 11/1994 | Johnson | A01G 23/04 220/4.24 |
| 5,381,625 | A | | 1/1995 | Wente | |
| 5,572,826 | A | | 11/1996 | Weder | |
| 6,050,027 | A | | 4/2000 | Pavelka et al. | |
| 6,085,459 | A | * | 7/2000 | Conner | A01G 9/02 47/41.01 |
| 6,553,714 | B2 | * | 4/2003 | Vahrmeyer | A47G 7/06 47/65.5 |
| 6,691,456 | B2 | * | 2/2004 | Vahrmeyer | A01G 9/02 47/66.2 |
| 7,836,632 | B2 | | 11/2010 | Mori et al. | |
| 8,181,386 | B1 | | 5/2012 | Riley, Jr. | |
| 9,986,695 | B1 | * | 6/2018 | Abdulzahra | A01G 24/00 |
| 10,039,238 | B2 | | 8/2018 | Samet | |
| 10,356,985 | B1 | * | 7/2019 | Raymond | A01G 9/02 |
| 10,470,378 | B2 | | 11/2019 | Shaffer et al. | |
| 2006/0156625 | A1 | * | 7/2006 | Abney, II | A01G 9/02 47/73 |
| 2008/0000154 | A1 | | 1/2008 | Schubiger | |
| 2008/0078118 | A1 | * | 4/2008 | Bissonnette | A01G 9/02 47/65.5 |
| 2009/0114789 | A1 | * | 5/2009 | Newby | A47G 7/06 248/318 |
| 2012/0137581 | A1 | * | 6/2012 | Teasdale | A01G 9/0293 47/66.7 |
| 2015/0334924 | A1 | | 11/2015 | Medeiros | |
| 2016/0205873 | A1 | * | 7/2016 | Wylie | A01C 1/046 |
| 2016/0242366 | A1 | | 8/2016 | Cute | |
| 2016/0374275 | A1 | * | 12/2016 | Galdi | A01G 9/0291 47/66.1 |
| 2017/0064915 | A1 | | 3/2017 | Steelandt | |
| 2017/0305594 | A1 | * | 10/2017 | Kasha | B65D 11/20 |
| 2020/0060101 | A1 | * | 2/2020 | Wylie | A01G 24/22 |
| 2022/0210983 | A1 | | 7/2022 | Mannoni | |
| 2023/0371441 | A1 | * | 11/2023 | Beers | A01G 9/02 |

FOREIGN PATENT DOCUMENTS

| | | | | | |
|---|---|---|---|---|---|
| CN | 118592295 | A | * | 9/2024 | A01G 9/086 |
| CN | 118716059 | A | * | 10/2024 | B08B 13/00 |
| CN | 118872507 | A | * | 11/2024 | A01C 11/003 |
| ES | 2253933 | A1 | * | 6/2006 | A01G 9/0291 |
| FR | 2796257 | A1 | * | 1/2001 | A47G 7/06 |
| KR | 200306825 | Y1 | * | 3/2003 | A01G 9/0302 |

* cited by examiner

BIODEGRADABLE TREE PLANTING APPARATUS

CROSS-REFERENCE TO RELATED APPLICATIONS

This application claims benefit to Provisional Application No. 63/564,662, filed Mar. 13, 2024, the contents of which are herein incorporated by reference.

BACKGROUND OF THE INVENTION

Field of Endeavor

The present disclosure relates to tree-planting apparatuses and, more particularly, to a biodegradable tree-planting apparatus.

Background of Related Art

Mangroves play a vital role in coastal ecology and in sustaining and securing coastal communities. Despite their importance, Mangrove ecosystems are under extreme pressure from human activity. Mangrove restoration can be challenging because Mangrove habitats are primarily coastal areas with loose and wet soil that is periodically submerged by tidal waters. Heavy coastal erosion and exposure to wave activity can also prevent Mangrove propagules from restarting naturally.

In recent years, the importance of sustainable practices in environmental conservation has become increasingly evident. Efforts to enhance biodiversity and restore ecosystems are necessary for maintaining ecological balance. However, traditional reforestation methods often involve devices that contain materials that do not decompose naturally, such as polyvinyl chloride (PVC) piping, and/or concrete structures, leading to environmental degradation and pollution. These conventional approaches may also require significant manual labor and resources, making them inefficient and costly for large-scale projects.

Despite advancements in technology, there remains a significant gap in the development of eco-friendly and efficient solutions. Current devices often fail to integrate materials that can naturally decompose without harming the environment. Additionally, existing solutions may not adequately address the need for streamlined processes that reduce labor and resource expenditure.

This highlights the importance of developing innovative approaches that not only support environmental sustainability but also enhance the efficiency and effectiveness of conservation operations.

SUMMARY OF THE INVENTION

In one embodiment, the disclosure includes a planting apparatus formed from a biodegradable material, comprising a first partial shell with a first half-spherical lower portion having a plurality of first holes, and one or more notches and a first half-frustoconical upper portion; and a second partial shell with a second half-spherical lower portion having a plurality of second holes, and one or more notches, and a second half-frustoconical upper portion, wherein the first partial shell and the second partial shell are joined to form a complete shell for holding a plant comprising a spherical lower portion and a frustoconical upper portion. One or more mating pairs of attachment tabs can be disposed on opposing portions of the first half-spherical lower portion and the second half-spherical lower portion and can be configured to aid in securing the lower portions to one another.

These and other features will be more clearly understood from the following detailed description taken in conjunction with the accompanying drawings and claims.

DETAILED DESCRIPTION OF THE INVENTION

Figure 1:
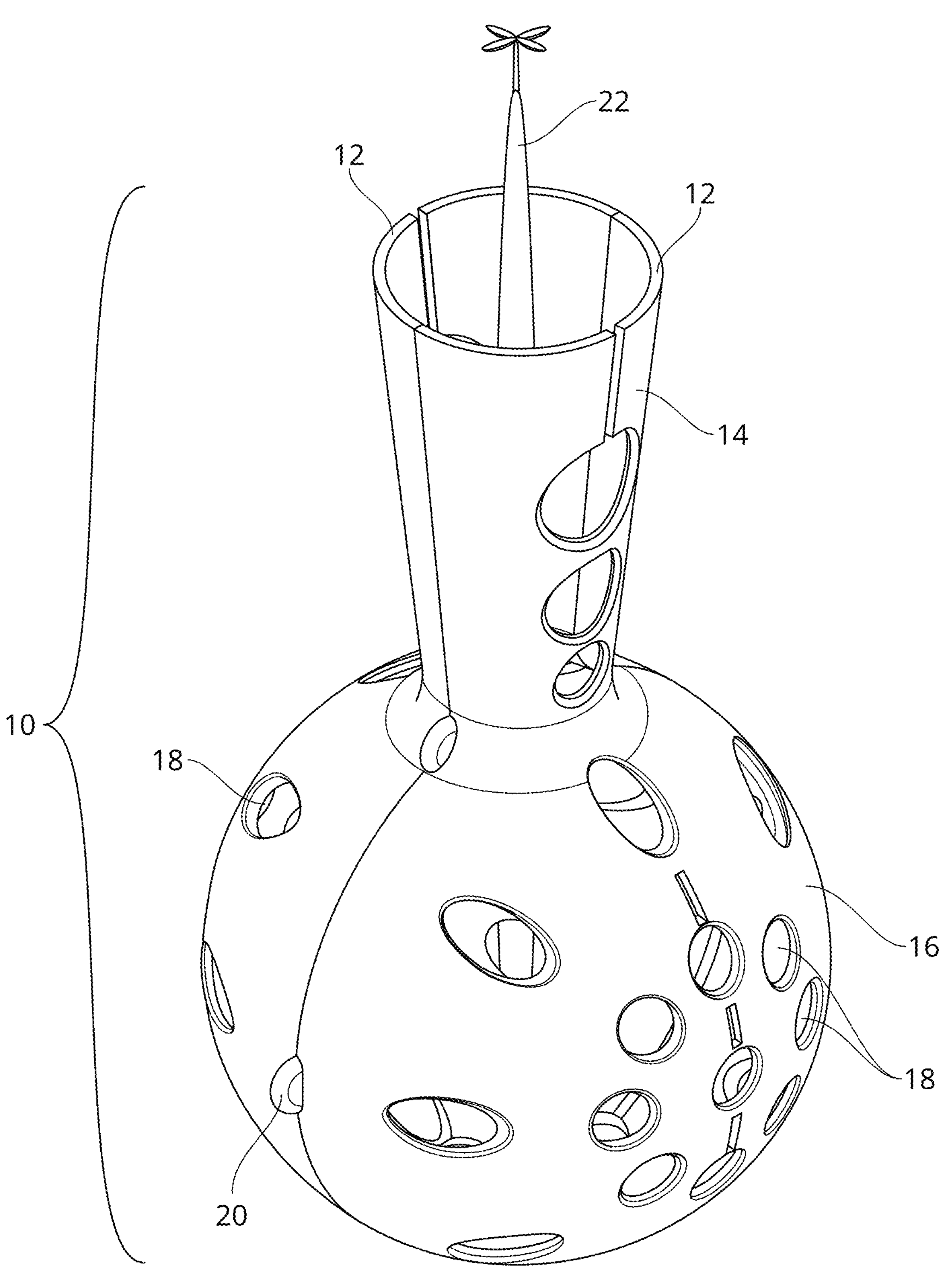
FIG. 1 is a perspective view of the biodegradable tree planting apparatus.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

In recent years, the degradation of coastal ecosystems, particularly mangrove forests, has become a pressing environmental concern. Mangroves play an important role in maintaining coastal ecology, providing habitat for diverse species, and protecting shorelines from erosion. However, these ecosystems face significant threats from human activities, such as deforestation, pollution, and coastal development. The restoration of mangrove habitats is challenging due to their specific environmental conditions, including loose, wet soil and periodic submersion by tidal waters. Additionally, natural regeneration is often hindered by heavy coastal erosion and wave activity, which can prevent mangrove propagules from establishing.

Traditional methods for mangrove restoration typically involve the use of devices having non-biodegradable materials, such as polyvinyl chloride (PVC) piping and concrete structures. While these materials can provide temporary support for young mangrove plants, they pose long-term environmental risks. Non-biodegradable materials contribute to pollution and can disrupt the natural ecosystem balance. Furthermore, these conventional approaches often require significant manual labor and resources, making them inefficient and costly for large-scale restoration projects. The reliance on such materials and methods underscores the need for more sustainable and eco-friendly solutions.

The present solution addresses these challenges by introducing a biodegradable tree-planting apparatus specifically designed for mangrove restoration. This innovative approach integrates materials that naturally decompose, minimizing environmental impact and promoting ecological balance. The apparatus is engineered to withstand the specific conditions of coastal environments, providing stability and support for young mangrove plants while reducing the need for extensive manual labor. By streamlining the planting process and utilizing sustainable materials, this approach enhances the efficiency and effectiveness of conservation efforts, offering a promising alternative to traditional restoration methods.

Broadly, an embodiment of the present disclosure provides a biodegradable planting apparatus for protecting tree propagules from the environment. The planting apparatus is made of two identical halves (shell) joined together with glue or other adhesive to create a vase-like structure with a bulbous, or spherical, perforated bottom area transitioning into a funnel-shaped, or frustoconical-shaped, top. The shells have notched/indented areas to increase the failure point as the seedlings outgrow the planter. The shells can be injection molded using biodegradable plastics, paper pulp, or other biodegradable materials, and seeded with bacteria to accelerate biodegradation in the marine and freshwater environment. The shells can have two sets of holes lining up in the vertical axis from each side of the funnel shape to anchor the planter with long nails or wood sticks. The planter can be strong enough to protect the mangrove seedling from debris impact and soil erosion or even airdrop deployment.

In embodiments, mangroves are "nursed" or planted as a young seedling and grown in a controlled nursery environment inside the biodegradable planting apparatus. The biodegradable planting apparatus with the year-old mangrove is then planted in the field. This way, the seedlings develop strong root systems and are better equipped to survive in the harsh conditions of their natural habitat. As the mangroves grow within these containers, their roots become well-established.

FIG. 1 shows an assembled planting apparatus 10 designed for the restoration of ecosystems, such as mangrove ecosystems. The apparatus is composed of several components that work together to provide a stable and supportive environment for a plant 22, such as a mangrove propagule, including planter halves 12, a half funnel, or half frustoconical, shaped collars 14, soil cavity 16, holes 18, one or more notches (unlabeled) and attachment tabs 20.

The apparatus 10 includes planter halves 12, which form the main structure of the apparatus 10. These halves are designed to be joined together, creating a complete shell that houses the plant 22. The planter halves 12 are equipped with a half-funnel, or half frustoconical, shaped collar 14, which serves to guide and support the plant 22 as it grows. This collar 14 aids in maintaining the plant's 22 upright position and ensuring that the plant 22 receives adequate sunlight and nutrients. In embodiments, the collar 14 can include holes 18, as described further hereinafter, and one or more notches configured to allow ease of breakage of the apparatus 10 as the plant 22 grows.

Within the planter halves 12, there is a soil cavity 16, which is configured to hold the soil necessary for the plant's 22 growth. The soil cavity 16 is configured to accommodate the root system of the plant 22, providing the plant 22 with the necessary space to expand and anchor the roots securely.

The apparatus 10 is also equipped with multiple holes 18 distributed across the surface of both the planter halves 12 and the half funnel, or half frustoconical, shaped collars 14. The holes 18 serve several purposes, including facilitating water drainage and allowing for the exchange of gases, which are important for the plant 22's respiration and overall health. Additionally, the holes 18 help to reduce the weight of the apparatus, making the apparatus easier to handle and deploy in various coastal environments. Additionally, the holes 18 allow one or more roots of the plant 22 to propagate into the environment where they are planted.

Attachment tabs 20 are integrated into the design of the planter halves 12. These tabs 20 are used to secure the halves together, ensuring that the apparatus remains intact and stable even in challenging environmental conditions, such as strong currents or wave activity. One or more adhesive materials can be applied to one or more portions of attachment tabs 20 to ensure securement of planter halves 12.

The plant 22, depicted as a mangrove propagule, is shown positioned within the apparatus 10. The design of the apparatus 10 is tailored to support the specific needs of mangrove plants, which are often subjected to fluctuating water levels and saline conditions. By providing a biodegradable and supportive structure, the apparatus 10 promotes the successful establishment and growth of mangrove plants, contributing to the restoration and preservation of important coastal ecosystems.

Figure 2:
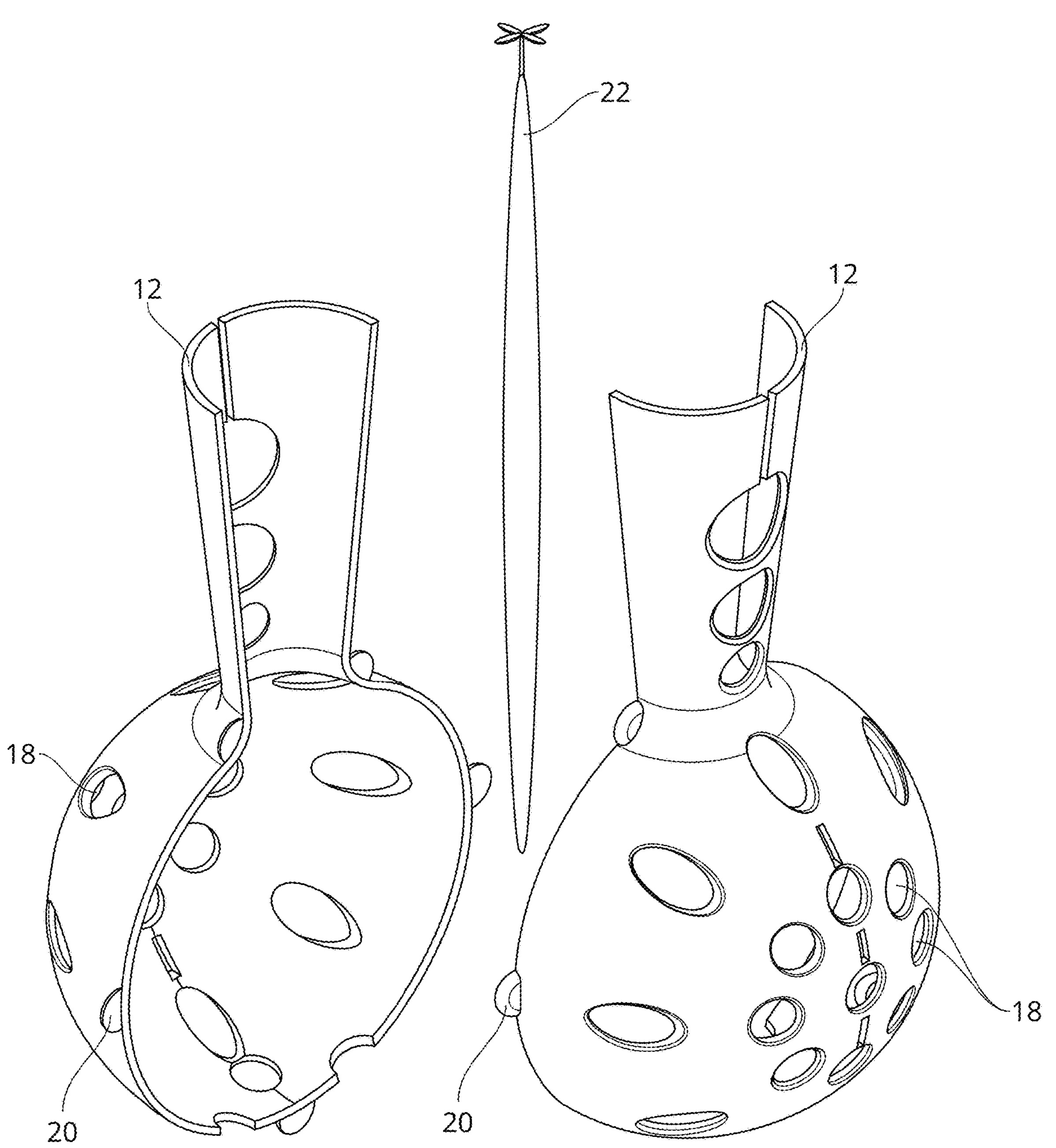
FIG. 2 illustrates a perspective view of the biodegradable tree-planting apparatus with planter halves and attachment tabs.

FIG. 2 shows an exploded view of the biodegradable tree planting apparatus 10, highlighting the important components and their arrangement. The apparatus is primarily composed of planter halves 12, which form the main structure of the device. These planter halves 12 are designed to be joined together to create a complete shell that houses a plant 22, such as a mangrove propagule. The design of the planter halves 12 is configured to provide a stable and supportive environment for the plant 22, ensuring successful growth and establishment in coastal ecosystems.

The planter halves 12 include multiple holes 18 distributed across their surface. These holes 18 serve several important functions, including facilitating water drainage and allowing for the exchange of gases, which are necessary for the plant 22's respiration and overall health. Additionally, the holes 18 help to reduce the weight of the apparatus, making the apparatus easier to handle and deploy in various coastal environments. Additionally, the holes 18 allow one or more roots of the plant 22 to propagate into the environment where they are planted. In addition to holes 18, each planter half 12 can include one or more notches, disposed across a midline of their respective soil cavity 16. The one or more notches are configured to allow for apparatus 10 to break easily as plant 22 grows. This design consideration is particularly significant for large-scale restoration projects, where ease of deployment and handling are of great importance.

Attachment tabs 20 are integrated into the design of the planter halves 12. These tabs 20 are used to secure the halves together, ensuring that the apparatus remains intact and stable even in challenging environmental conditions, such as strong currents or wave activity. One or more adhesive materials can be applied to one or more portions of attachment tabs 20 to ensure securement of planter halves 12. The attachment tabs 20 enhance the durability and reliability of the apparatus, contributing to the effectiveness of the apparatus in supporting mangrove restoration efforts.

Figure 3:
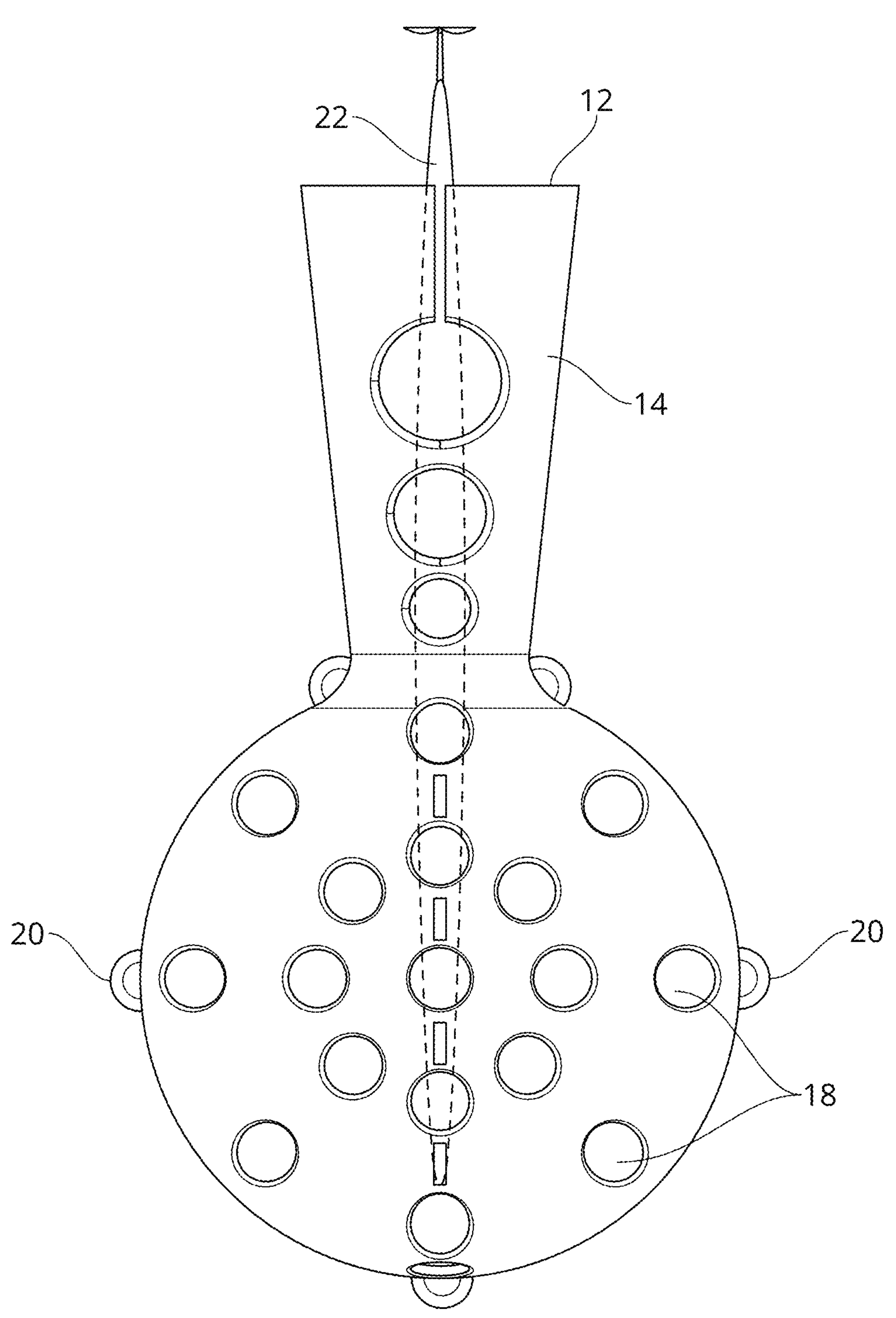
FIG. 3 is a schematic diagram illustrating the assembly of the biodegradable tree-planting apparatus.

FIG. 3 shows a side view of the biodegradable tree planting apparatus 10, emphasizing the attachment tabs 20 and holes 18. The apparatus is designed to facilitate the growth and establishment of a plant 22, such as a mangrove propagule, in challenging coastal environments.

The planter halves 12 form the primary structure of the apparatus, providing a stable and supportive environment for the plant 22. These halves are designed to be joined together, creating a complete shell that houses the plant 22. The half funnel shaped collar 14 is integrated into the planter halves 12, serving to guide and support the plant 22 as it grows. This collar aids in maintaining the plant's upright position and ensures that the plant receives adequate sunlight and nutrients.

The holes 18 are strategically distributed across the surface of the planter halves 12. These holes serve multiple purposes, including facilitating water drainage and allowing for the exchange of gases, which are important for the plant 22's respiration and overall health. Additionally, the holes help to reduce the weight of the assembled planting apparatus 10, making the apparatus easier to handle and deploy in various coastal environments. This design consideration is particularly significant for large-scale restoration projects, where ease of deployment and handling are of great importance.

The attachment tabs 20 are integrated into the design of the planter halves 12. These tabs are used to secure the halves together, ensuring that the apparatus remains intact and stable even in challenging environmental conditions, such as strong currents or wave activity. The attachment tabs enhance the durability and reliability of the apparatus, contributing to the effectiveness of the apparatus in supporting mangrove restoration efforts.

The plant 22 is depicted within the apparatus 10, illustrating how the design is tailored to support the specific needs of mangrove plants, which are often subjected to fluctuating water levels and saline conditions. By providing a biodegradable and supportive structure, the apparatus promotes the successful establishment and growth of mangrove plants, contributing to the restoration and preservation of important coastal ecosystems.

In use Biodegradable Planting Apparatus 10, can be manufactured using an injection molding process, or other additive manufacturing process, using one or more biodegradable raw materials, such as biodegradable plastics, i.e. Polyhydroxyalkanoates (PHAs), paper pulp, or other biodegradable materials. Additionally, during manufacturing the apparatus can be seeded with one or more bacteria, configured to accelerate biodegradation of the apparatus. Once manufactured, planter halves 12 can be joined around a plant sapling disposed in soil, using one or more adhesives. Once joined, planter halves 12 form apparatus 10, which can be distributed, as needed, for reforestation. As a sapling grows it strains apparatus 10 until the apparatus is broken and subsequently biodegrades adding nutrients to nourish the sapling. Finally, any carbon associated with apparatus 10 biodegradation is sequester by the plant, or subsequent forest.

It should be understood, of course, that the foregoing relates to exemplary embodiments of the invention and that modifications may be made without departing from the spirit and scope of the invention as set forth in the following claims.

What is claimed is:

1. A planting apparatus for mangrove restoration comprising:

a first partial shell comprising:

a first half-spherical lower portion having a plurality of first holes, and one or more notches configured to facilitate breakage of the first partial shell as the mangrove plant grows, and a first half-frustoconical upper portion having a plurality of said first holes, wherein at least a first subset of said plurality of first holes are sized and positioned to receive elongated anchoring members for securing the apparatus in a coastal substrate against tidal forces, and one or more first vertical elongated slots disposed in the first partial shell and configured to allow a mangrove plant to split open the first partial shell as the plant grows; and a second partial shell comprising:

a second half-spherical lower portion having a plurality of second holes, and one or more notches configured to facilitate breakage of the second partial shell as the mangrove plant grows, and a second half-frustoconical upper portion having a plurality of said second holes, wherein at least a first subset of said plurality of second holes are sized and positioned to receive elongated anchoring members for securing the apparatus in a coastal substrate against tidal forces, and one or more second vertical elongated slots disposed in the second partial shell and configured to allow a mangrove plant to split open the second partial shell as the plant grows; wherein:

the first partial shell and the second partial shell are joined to form a complete shell for holding a mangrove plant comprising a spherical lower portion sized and shaped to accommodate a mangrove root ball, and a frustoconical upper portion sized and shaped to guide vertical growth of a mangrove propagule.

2. The planting apparatus of claim 1, wherein the first partial shell and the second partial shell are formed from at least one biodegradable material.

3. The planting apparatus of claim 2, wherein the at least one biodegradable material is one or more of: biodegradable plastic, and paper pulp.

4. The planting apparatus of claim 1, wherein the first half-spherical lower portion further comprises: one or more attachment tabs configured to secure the first partial shell to the second partial shell.

5. The planting apparatus of claim 1, wherein the second half-spherical lower portion further comprises: one or more notches configured to facilitate breakage of the second partial shell as the mangrove plant grows; and one or more attachment tabs configured to secure the second partial shell to the first partial shell.

* * * * *